May 2, 1933.  A. B. MODINE  1,906,994
HEATING AND VENTILATING DEVICE
Filed Aug. 26, 1929   2 Sheets-Sheet 1
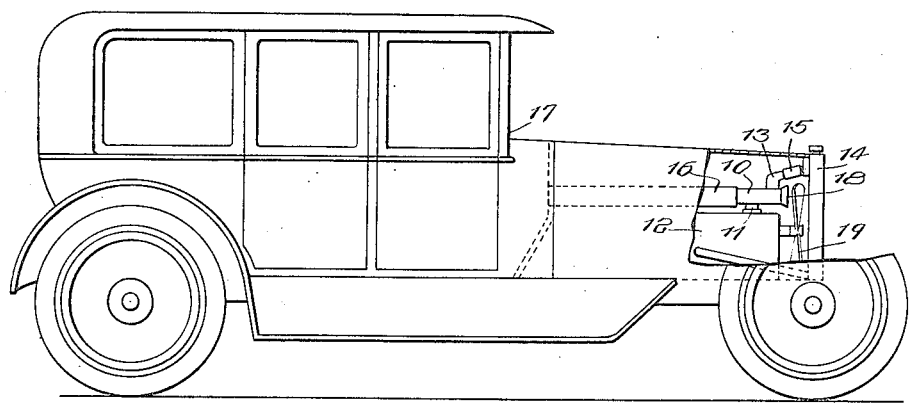
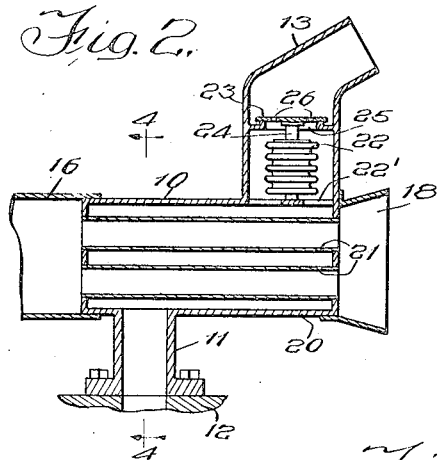
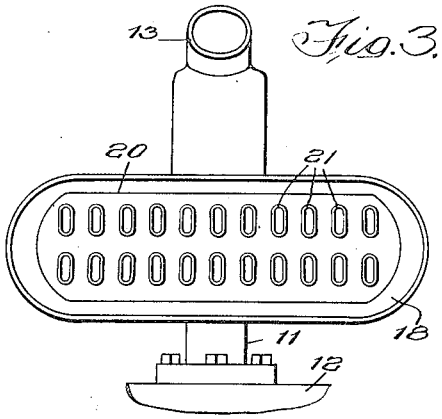
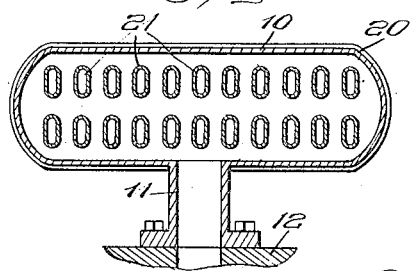
Witness:
William P. Kilroy
Inventor
Arthur B. Modine
By Hill & Hill
Attys May 2, 1933. A. B. MODINE 1,906,994
HEATING AND VENTILATING DEVICE
Filed Aug. 26, 1929   2 Sheets-Sheet 2
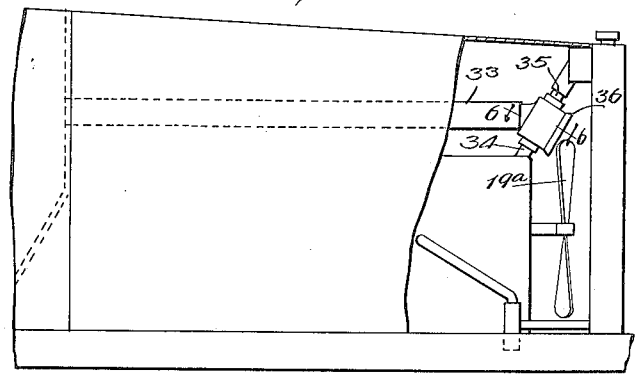
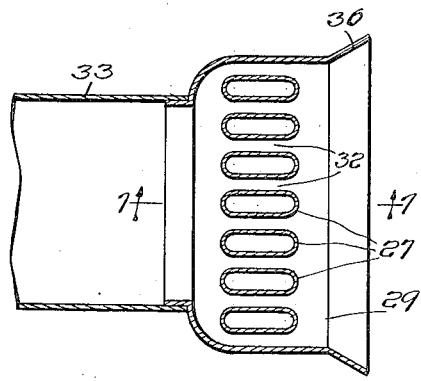
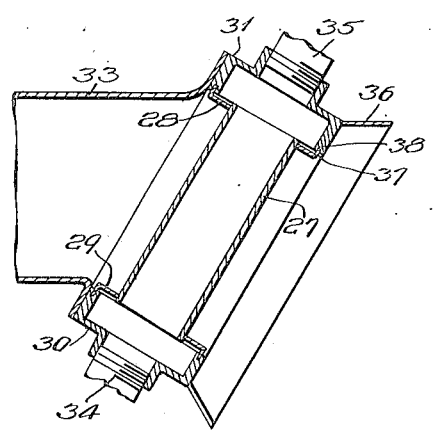
Witness
William P. Kilroy
Inventor
Arthur B. Modine
By Hill, Hill Attys.

Patented May 2, 1933

1,906,994

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

HEATING AND VENTILATING DEVICE

Application filed August 26, 1929. Serial No. 388,493.

The invention relates to a heating and ventilating means for vehicles and has among its objects the provision of means whereby air is heated and introduced in this condition to the interior of the vehicle body.

The invention has as a further object the provision of means capable of being incorporated in the circulatory system for the cooling medium of the engine and to provide means for subjecting air to the heat of the cooling medium and thereby heat the air prior to its introduction to the vehicle body.

Another object of the invention is to provide a device of this character with a thermally operable means for retarding the flow of said cooling medium and thus facilitate heating a portion of the cooling medium to a temperature at which it may give off heat to the air subjected thereto, without requiring the entire body of the cooling medium of the engine to be heated before it can function to heat the air introduced to the vehicle body.

Another object of the invention is to provide a device of this character with a radiator through which water or any other cooling medium for the engine may circulate and to arrange said radiator with respect to an air passage so that said passage and radiator intersect each other so that said air passing through the air passage is heated by said radiator and introduced to said vehicle body.

Another object of the invention is to provide a construction capable of being connected with an engine block and the radiator of the engine to thereby provide means for completing a connection between these parts, which connection provides a fluid passage and to combine therewith an air passage, one end of the air passage being arranged to discharge heated air to the vehicle, the opposite end of the passage being arranged in proximity to the fan of the engine so that the fan may be employed to drive the air through the heating means and into the vehicle.

The invention has these and other objects, all of which will be explained in detail and more readily understood when read in conjunction with the accompanying drawings which illustrate various embodiments of which the invention is susceptible, it being obvious that various changes and modifications may be resorted to without departing from the spirit of the appended claims forming a part hereof.

In the drawings, Fig. 1 is a side elevation of an automobile, a portion of the hood being broken away to illustrate the device applied for use;

Fig. 2 is a central longitudinal section of a portion of the device shown in Fig. 1;

Fig. 3 is an end view of the structure shown in Fig. 2;

Fig. 4 is a section taken on line 4—4 of Fig. 2;

Fig. 5 is an elevation of a portion of an automobile, parts being broken away for the purpose of illustration;

Fig. 6 is a section taken on line 6—6 of Fig. 5; and

Fig. 7 is a section taken on line 7—7 of Fig. 6.

The device illustrated for accomplishing the various objects contemplates the provision of an element generally designated 10 having a tubular extension 11 whereby the device may be connected with a port provided in the water jacket of the engine 12. The device 10 is further provided with the tubular element 13 which may be connected with the radiator 14 by means of the tubular connection 15. A member 16 providing a tubular passage is connected with another portion of the device and one end of the passage terminates so as to discharge heated air into the interior of the body of the vehicle generally designated 17. The device 10 is further provided with a mouth or opening 18 which is arranged adjacent the periphery of the fan 19.

By referring to Figs. 2, 3, and 4, it will be noted that the device generally designated 10 includes a relatively long and narrow hollow jacket 20 which has a plurality of tubular elements 21 arranged therein which communicate with the mouth or opening 18 and the tubular member 16 which extends from the device 10 to the interior of the vehicle body. These tubular passages 21 form air passages and allow air entering the mouth 18 to pass into and be discharged from the tubular member 16.

It will be noted by referring to Fig. 2 that the jacket 20 is connected with the water jacket of the engine 12 through the medium of the connection 11 and that the water jacket 20 has an outlet 13 connected therewith which is adapted to be connected with the radiator 14 of the engine and thus provide means whereby water or other cooling medium for the engine may circulate from the engine through the device 10 and through the radiator 14, which will thus heat the material of the tubular passages 21 and the air entering the mouth 18 as said air passes through said tubes 21 into the tubular member 16. The device illustrated also includes a thermally operable diaphragm 22 which is arranged in the liquid passage and is connected at one end with a stationary spider 22'. The diaphragm 22 has a valve 23 secured to the stem 24 thereof, the valve being provided to control the opening 25 which forms a passage between the device generally designated 10, the engine and the radiator.

The valve 23 is provided with one or more apertures 26 which allow a certain amount of flow of the cooling medium even though the valve 23 is closed. The arrangement just described is provided to form a means to prevent circulation of the cooling medium until a portion thereof is brought to a desired temperature which will thus cause heated air to be introduced to the interior of the vehicle without necessitating heating the entire body of the cooling medium before the heat thereof can be availed of to heat the air introduced to the vehicle body. It will be noted that the structure just described is capable of being substituted for the ordinary hose and other connection extending between the engine and the radiator and that the tubular element 16 may be disconnected or associated with this last mentioned device and therefore provides a means capable of being applied by any one desiring to avail himself of the benefits of a device of this character.

The structure illustrated in Figs. 5 to 7, inclusive, substantially corresponds with that shown and described in connection with Figs. 1 to 4, but differs from this last mentioned structure in that water tubes 27 are employed which are connected at their opposite ends with plates respectively designated 28 and 29 which form a closure for an opening provided in the headers respectively designated 30 and 31, it being understood that the tubes 27 are arranged in the manner shown in Fig. 6 so as to produce spaces 32 through which air may pass between said tubes and be heated thereby prior to its introduction to the tubular member 33. The headers 30 and 31 are respectively provided with an inlet connection 34 and an outlet connection 35 which are respectively designed for connection with the radiator and the engine as described in connection with the structure shown in Figs. 1 to 4. These headers and tubes are encased in a member having the flared opening or mouth 36 which faces in the direction of the fan 19a so that air currents created by rotation of the fan are introduced to the mouth 36 and are driven between the radiator tubes 27 and thence into the tubular extensions 33 of this structure. The plates 28 and 29 are secured to the headers 30 and 31 through the medium of the longitudinally extending flanges designated 37 which are arranged in longitudinal grooves such as 38 provided in the headers, the flanges being brazed or otherwise secured in said grooves. These plates are of a character which permit linear extension and contraction of the tubes 27 without resulting in breakage or leakage between the connection between the headers and the plates such as 28.

From the foregoing description, it is evident that a relatively simple arrangement is produced capable of being arranged in the circulatory system of the cooling medium of an engine having means allowing for circulation of the cooling medium and circulation of air, the latter of which contacts with the tubes of the device and allows this heat to be transferred to the air which in this condition is introduced to the interior of the vehicle body. It is further evident that the structure includes means whereby air may be heated and introduced to the vehicle body even though the machine is not travelling, this being accomplished through the agency of the fan 19 which creates air currents which are introduced into the mouth 18 of the device. It is manifest that the structure is such that it may be readily applied for use by those other than skilled mechanics and that said device also includes means for retarding flow of the cooling medium until a portion thereof is heated to the desired temperature.

Having thus described my invention, what I claim as new and desire to secure by Letters Patent is:

1. In a device of the character described, the combination of a member having intersecting fluid passages, one of said passages providing part of a passage for the cooling liquid of an engine and providing an element of means for heating the fluid passing through the other passage by the heat of the cooling liquid, and thermally operable means for controlling the flow of liquid in said last mentioned passage.

2. In a heater for motor vehicles, said heater having a liquid passage for connection with the liquid passage of the engine of said vehicle, and having thermally controlled means for controlling the flow of said liquid through said passage, said means being located at the outlet of said passage, said heater having an air passage intersecting the liquid passage, the opposite ends of said air passage respectively opening into the atmosphere and the interior of said vehicle.

3. In a heater for motor vehicles the combination of a member having a passage, one end of which is adapted to be connected with the water jacket of the engine of the vehicle, the opposite end having means whereby this end may be connected with the radiator of said vehicle to complete the circulatory system for the cooling medium of said engine, thermally controlled means provided in said first mentioned passage, said member having an air passage one end of which communicates with the atmosphere, the opposite end of said passage having means whereby a tubular member may be connected thereto to complete a connection between said air passage and the interior of the vehicle body.

4. In a device of the kind described, a member providing a heater for air for a vehicle body, said heater being adapted to be connected in the circulatory system for the cooling liquid of an engine, said heater including a casing having air passages and fluid passages, said casing having tubular sections extending therefrom, respectively, providing means for supporting said heater by said engine and to connect said heater with the water jacket of said engine, and to a radiator for said engine, said heater also including other tubular sections extending from said casing communicating with the air passages of said casing, said other tubular sections respectively providing an air inlet to said casing and an element adapted to communicate with the interior of said vehicle body providing an outlet of said casing.

5. In a device of the kind described, a member providing a heater for air for the interior of a vehicle body, said heater being adapted to be connected with the circulatory system for the cooling liquid of an engine, said member having means providing a passage whereby air is introduced to said member from the outside of the vehicle body and delivered to the interior of said body, said member having means located between the opposite ends of said passage providing means for supporting said member by said engine and providing a connection between the water jacket of said engine and a connection with the inlet to a radiator for said engine and providing means for heating air circulating through said passage of said member.

6. In a device of the kind described, a member providing a heater for air for a vehicle body, said member being adapted to be connected in a circulatory system for the cooling liquid of an engine and supported by the engine, said member being comprised of a casing having elements respectively providing passages for air and passages for liquid, the latter passages being connected in said circulatory system one of said elements being connected with the outlet of the water jacket of the engine and providing a support for said member and the other providing an inlet to a radiator for said engine, said casing having an opening which communicates with atmosphere and having a tubular extension which extends from said casing to the interior of the vehicle body and communicates with said opening of said casing which communicates with the atmosphere.

7. In a device of the kind described, a member providing a heater for air for a vehicle body, said heater having means adapted to be connected in the circulatory system for the cooling liquid of an engine and providing for the support of said member by said engine and having an element providing an air passage extending in opposite directions from said heater, one end of said element providing a communication with atmosphere and the opposite end of said element providing means whereby said heater may be connected with the interior of said vehicle.

8. In a device of the kind described, a member providing a heater for air for a vehicle body, said member being adapted to be connected in the circulatory system for the cooling liquid of an engine and arranged exteriorly of the body of the vehicle, said member having intersecting passages, respectively, providing an air and a liquid passage, the liquid passage being connected in said circulatory system between the outlet of the water jacket for said engine and the inlet to a radiator for said engine, one end of said liquid passage providing a connection and a support whereby said heater may be connected with and supported by said engine, the air passage having one end opening to atmosphere and having the opposite end in communication with the interior of the vehicle body.

In witness whereof, I hereunto subscribe my name this 22nd day of August, A. D. 1929.

ARTHUR B. MODINE.